(12) United States Patent
Borg et al.

(10) Patent No.: US 7,296,504 B2
(45) Date of Patent: *Nov. 20, 2007

(54) PYROTECHNIC ACTUATOR OF THE VARIABLE-THRUST-ACTING TYPE

(75) Inventors: Evrard Borg, Sanary (FR); Laurent D'Emmanuelle, Toulon (FR); Eric Laspesa, Six Fours (FR); Jean-Paul Nadeau, Ollioules (FR)

(73) Assignee: SNPE Materiaux Energetiques, Paris (FR)

( * ) Notice: Subject to any disclaimer, the term of this patent is extended or adjusted under 35 U.S.C. 154(b) by 396 days.

This patent is subject to a terminal disclaimer.

(21) Appl. No.: 10/865,847

(22) Filed: Jun. 14, 2004

(65) Prior Publication Data

US 2005/0016371 A1 Jan. 27, 2005

(30) Foreign Application Priority Data

Jul. 10, 2003 (FR) .................................. 03 08476

(51) Int. Cl.
*B64D 1/04* (2006.01)

(52) U.S. Cl. .............................. 89/1.14; 89/7; 89/27.3; 102/254; 102/531

(58) Field of Classification Search ................. 89/1.14, 89/7, 27.3; 102/254, 531
See application file for complete search history.

(56) References Cited

U.S. PATENT DOCUMENTS

| | | | | |
|---|---|---|---|---|
| 2,935,971 A | * | 5/1960 | Stott et al. ..................... | 60/636 |
| 3,242,666 A | * | 3/1966 | Peterson ....................... | 60/636 |
| 4,619,199 A | * | 10/1986 | Giladett ....................... | 102/254 |
| 5,303,631 A | | 4/1994 | Frehaut et al. | |
| 6,942,261 B2 | * | 9/2005 | Larsen et al. ................ | 293/107 |
| 7,059,458 B2 | * | 6/2006 | Borg et al. .................. | 188/371 |

FOREIGN PATENT DOCUMENTS

| | | |
|---|---|---|
| DE | 38 17 042 A1 | 12/1988 |
| EP | 0 550 321 A | 7/1993 |
| FR | 2 824 875 | 11/2002 |
| JP | A 50-79676 | 6/1975 |

* cited by examiner

*Primary Examiner*—M. Clement
(74) *Attorney, Agent, or Firm*—Oliff & Berridge, PLC

(57) ABSTRACT

The technical field of the invention is that of pyrotechnic actuators comprising a piston, the basic function of which is to exert a thrust so as to displace an object by shooting out the piston.

More particularly, the invention relates to a pyrotechnic actuator (1, 1a, 1b, 1c) comprising a pyrotechnic-gas generator (7), a combustion chamber (3) and a piston (9) which can move in a slide chamber (5) under the effect of the said gases.

The principal characteristic of this actuator is that it comprises a shut-off device (4, 4a, 4b, 4c) used after the triggering of the said actuator (1, 1a, 1b, 1c) in order, on the one hand, to close the slide chamber (5) and, on the other hand, to secure the depressurization of the combustion chamber (3).

17 Claims, 4 Drawing Sheets

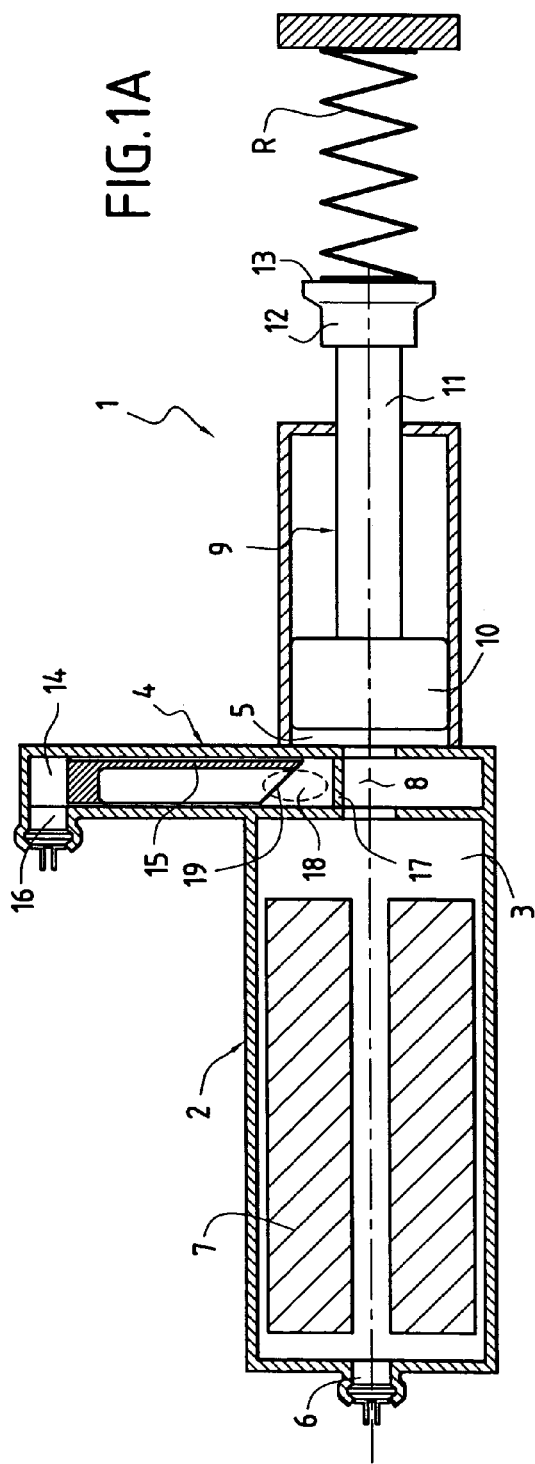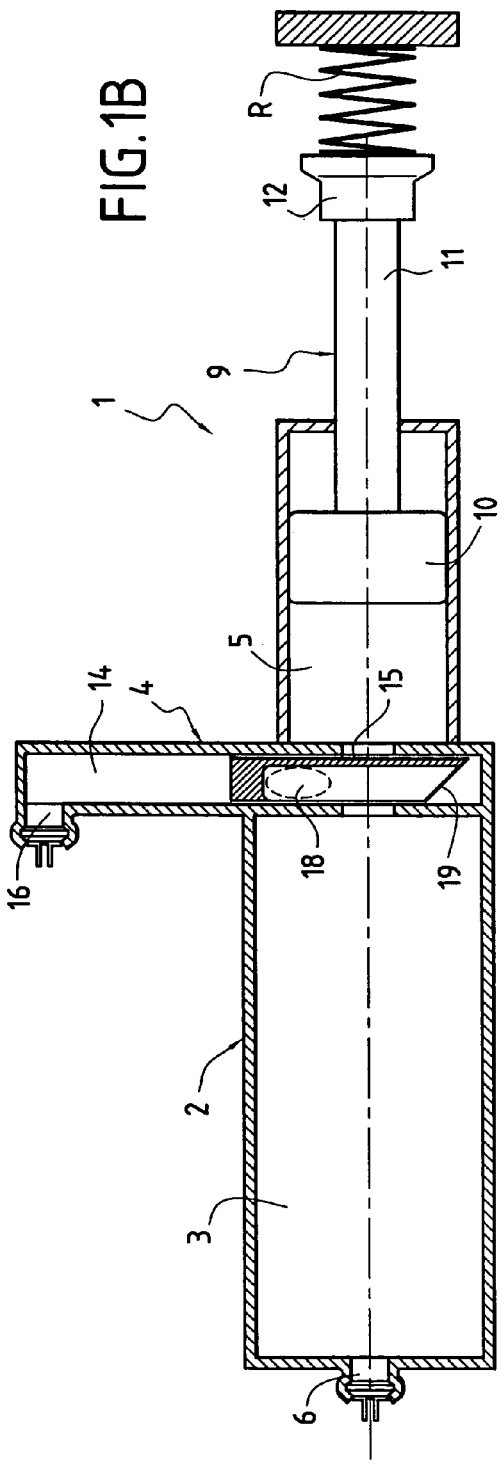

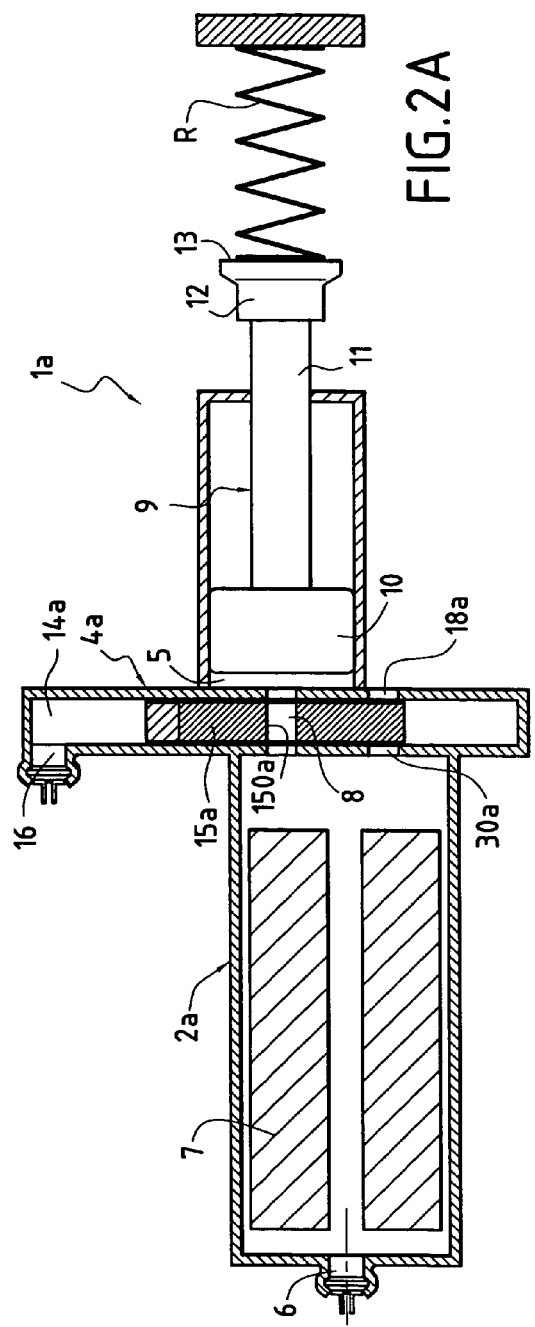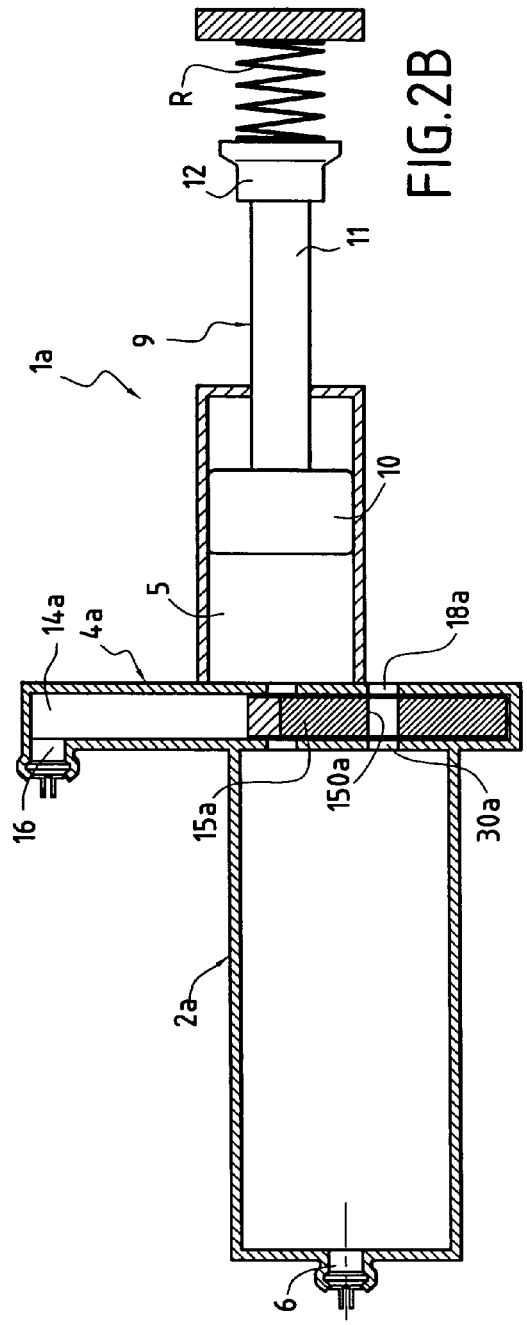

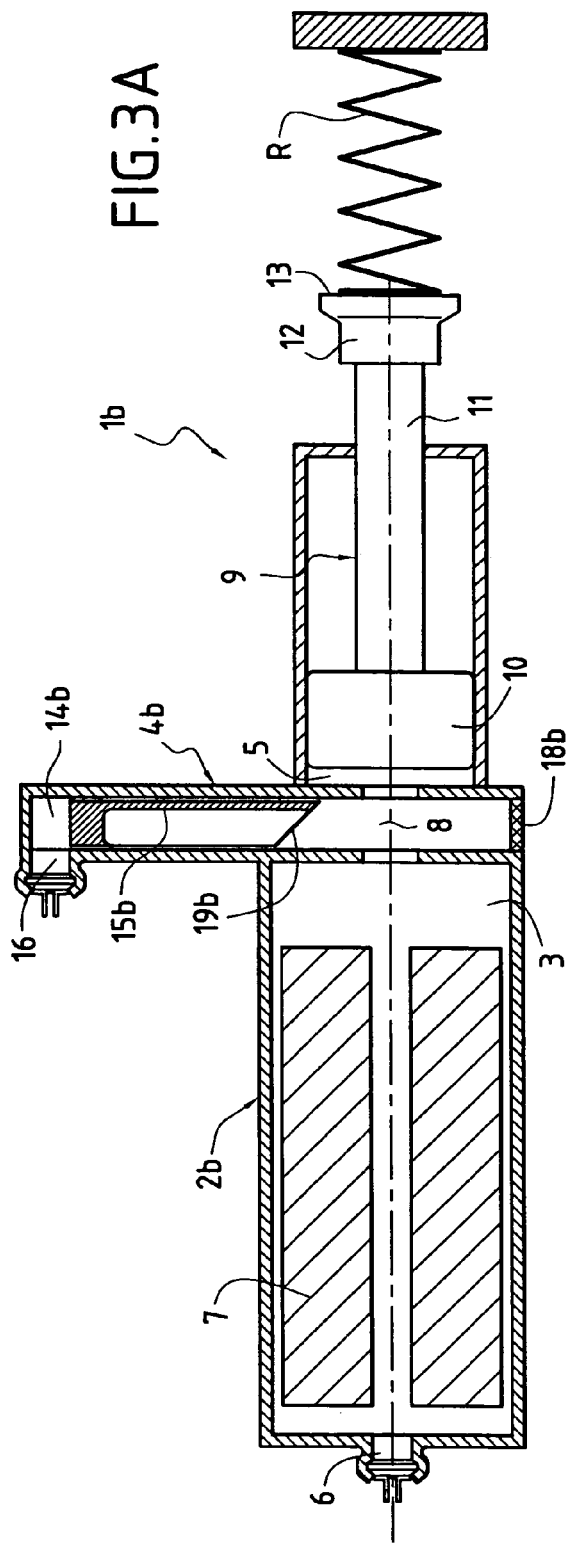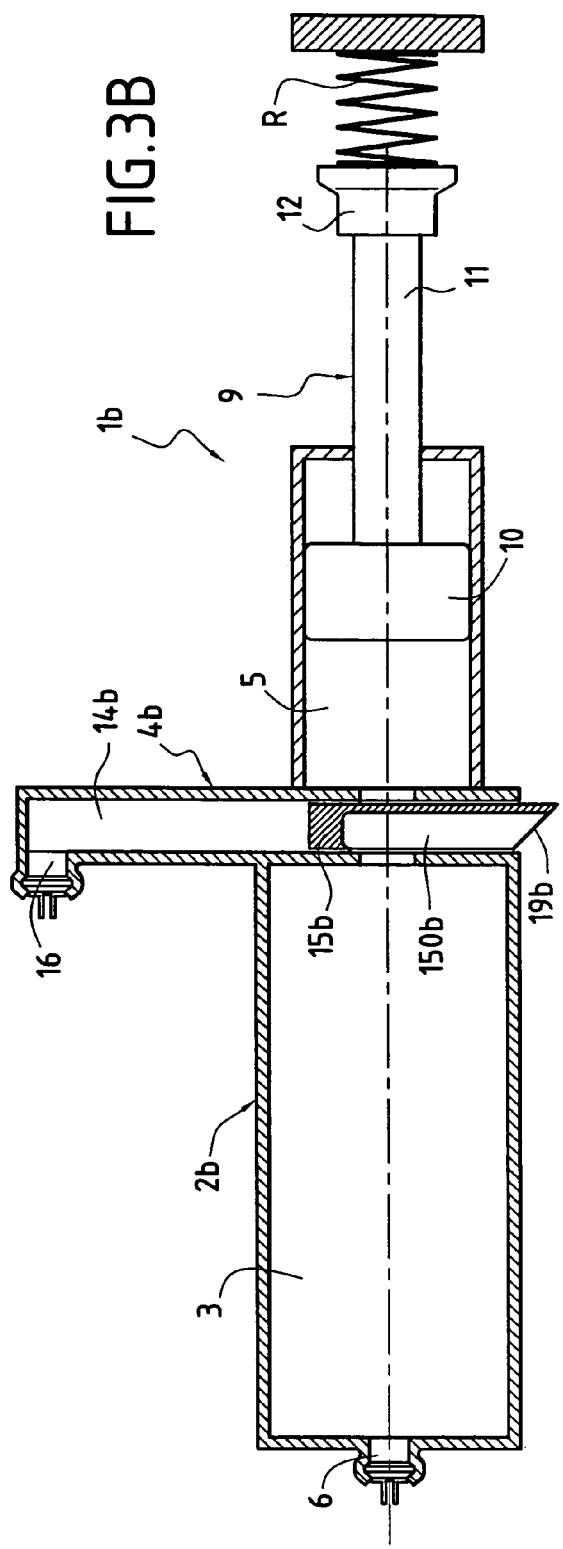

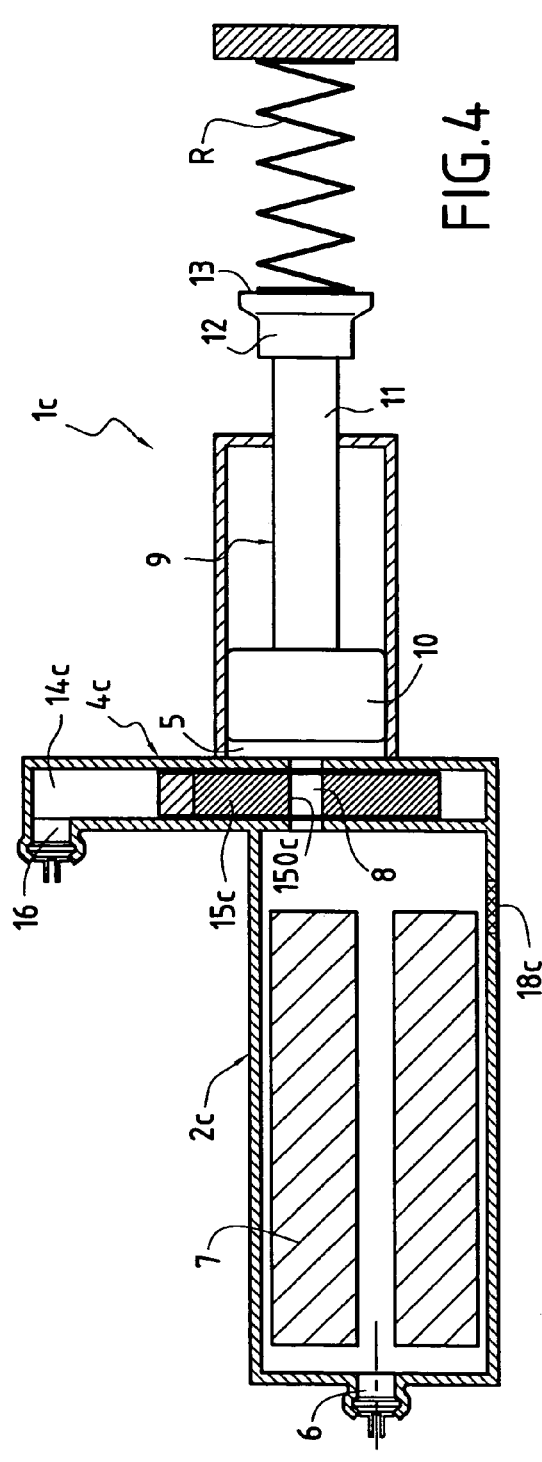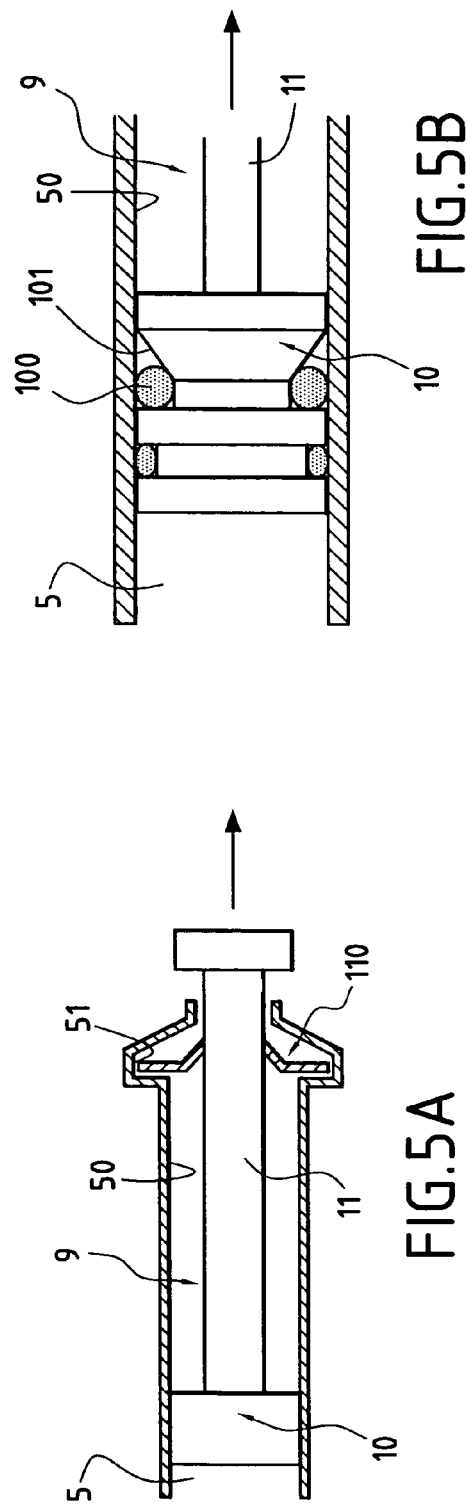

PYROTECHNIC ACTUATOR OF THE VARIABLE-THRUST-ACTING TYPE

The technical field of the invention is that of pyrotechnic actuators comprising a piston, the basic function of which is to exert a thrust so as to displace an object by shooting out the piston. The pyrotechnic actuators according to the invention are particularly suitable for use in security systems used in automotive vehicles and designed, for example, to cushion the displacement of certain parts which have been set in motion upon mechanical impact of the automotive vehicle with an external element, such as, for example, a safety belt, the front bumper of the vehicle, the steering column or the bonnet of the vehicle in the event of a frontal collision between the vehicle and a pedestrian.

Pyrotechnic actuators involving a piston have already formed the subject of several patent applications.

Patent EP 0 550 321 can be cited here, which describes a pyrotechnic thruster with cushioned stroke which can be used in any type of energy absorption system. This thruster comprises a pyrotechnic-gas generator, a piston, a combustion chamber for pyrotechnic materials and a back-pressure chamber, as well as an intermediate chamber contained in the said combustion chamber and one end of the piston. A duct links the intermediate chamber to the back-pressure chamber. The gases emitted by the generator pressurize the intermediate chamber so as to combat the motion of the piston and hence cushion its stroke, a part of the said gases being conveyed by the duct towards the back-pressure chamber.

Patent application FR 2 824 875 relates to a pyrotechnic actuator possessing a body, a piston, and a retaining washer for retaining the said piston in the said body. According to the starting position of the piston in the body, the actuator can either exert a thrust upon an object by shooting out the said piston from the said body, or can release a mechanical part by retracting the piston into the said body.

The pyrotechnic actuators described in these two patents have a nominal working characterized by a constant displacement amplitude of the piston, thus producing a single effect upon the parts or objects intended to interact with the said actuators. The pyrotechnic actuators according to the invention involve a mechanical device for regulating the pressure in the slide chamber of the piston, whereby the displacement amplitude of the said piston can be kept under control. In this way, the pyrotechnic actuators according to the invention are of the variable-thrust-acting or even parameterizable-stroke type and can therefore adapt to a plurality of configurations requiring a greater or lesser displacement of the piston.

The subject of the present invention concerns a pyrotechnic actuator comprising a pyrotechnic-gas generator, a combustion chamber and a piston which can move in a slide chamber under the effect of the said gases, characterized in that the said actuator comprises a shut-off device used after the triggering of the said actuator in order, on the one hand, to close the slide chamber and, on the other hand, to secure the depressurization of the combustion chamber.

In fact, the displacement amplitude of the piston in the slide chamber is linked to the pressure level reached in the said chamber. The shutting-off of this chamber freezes the piston in a set position. This closure having been secured, the gases then accumulate haphazardly in the combustion chamber, with a not insignificant risk of explosion. It is therefore necessary to secure the depressurization of the combustion chamber as quickly as possible after the slide chamber has been shut off.

Advantageously, the shut-off device is autonomous and can be triggered from a control room.

The decoupling of the triggering of the shut-off device with that of the triggering of the actuator helps to increase the flexibility of use of the said actuator by allowing unrestricted intervention by the user at the moment he deems most appropriate.

Preferably, the shut-off device is incorporated in the combustion chamber and is in contact with the slide chamber.

According to a preferred embodiment, the shut-off device is constituted by a slide valve part capable of moving under the effect of a motor in a slide housing.

According to one particularity of this embodiment, the motor is a pyrotechnic-gas generator.

According to a preferred embodiment of the invention, the pyrotechnic-gas generator is equipped with an ignition system and with a gas-generating pyrotechnic charge.

According to another particularity, the displacement of the slide valve part takes place along an axis perpendicular to that of the displacement of the piston.

According to a first design variant, the slide housing is equipped with a vent, the slide housing and the combustion chamber being separated from each other by a material veil. In this way, the slide housing and the combustion chamber do not communicate with each other and the said housing constitutes a space which is open to the exterior via the vent.

According to one particularity of this first variant, the slide valve part is hollow and has a cutting end, so that the displacement of the said part in the slide housing firstly brings about the rupturing of the material veil, then, simultaneously, the shutting-off of the slide chamber of the piston and the link-up of the combustion chamber with the slide housing. More precisely, the cutting end of the slide valve part comes into contact with the material veil, then pierces it, whereas the hollow part of the slide valve part becomes a conduit securing the passage between the combustion chamber and the slide housing. The shutting-off of the slide chamber is realized via a portion of the side wall of the slide valve part.

According to a second design variant, the combustion chamber possesses at least one vent emerging on the outside of the said actuator, so that the shut-off device, which initially shuts off the said vent and allows communication between the slide chamber and the combustion chamber, moves so as to proceed to shut off the slide chamber and free the vent in order to evacuate the gases from the combustion chamber.

According to one particularity of this second design variant, the slide valve part is traversed by a duct initially linking the combustion chamber to the slide chamber, the said part being capable of moving in the slide space under the effect of the motor such that the duct links the combustion chamber to the outside of the actuator at the level of the vent.

According to a third design variant, the combustion chamber possesses an embrittlement zone, so that the shut-off device, which initially allows communication between the slide chamber and the combustion chamber, moves so as to proceed to shut off the slide chamber and cause the combustion chamber to open at the level of its embrittlement zone.

According to one particularity of this third variant, the slide valve part is hollow and has a cutting end, so that the displacement of the said part in the slide housing brings about the shutting-off of the slide chamber and causes the embrittlement zone to rupture, by mechanical impact, in order to evacuate the gases emanating from the generator towards the outside of the said actuator. In this variant, once the slide chamber is shut off, the hollow part acts as a conduit for conveying the gases from the combustion chamber towards the outside of the actuator.

According to a fourth design variant, the combustion chamber possesses a calibrated cap capable of rupturing over and above a threshold pressure in order to evacuate the gases towards the outside of the actuator.

Preferably, the piston has a body prolonged by a rod, the diameter of the said body being substantially less than that of the slide chamber.

According to a preferred embodiment of the invention, the actuator comprises a non-return device preventing the return movement of the piston towards the inside of the slide chamber.

According to a preferred embodiment of the invention, the slide chamber is situated between the shut-off device and the body of the piston.

According to the invention, the actuator can comprise means for resisting the movement of the piston generated under the effect of the gases. According to one particularity, these resistance means are constituted by a spring placed around the rod of the piston. The provision of means for resisting the movement of the piston produces an actuator with parameterizable stroke. The force necessary to displace the piston is known and is a function of the stiffness constant of the spring inside the actuator.

Pyrotechnic actuators according to the invention have the advantage of being autonomous and of having a compact size by virtue of great simplicity of design. They can therefore be easily inserted in any type of device or object calling for functions required by such actuators. In addition, they have all the advantages linked to the use of pyrotechnic charges, namely: reliability due to the control over the ignition, compact size due to the smallness of the pyrotechnic charges, and a wide variety of effects due to the diversity of the pyrotechnic components which can be used for these actuators. Finally, the use of pyrotechnic charges allows a perfectly controlled sequential ignition between the actuator and the shut-off device.

The detailed description of a preferred embodiment of the invention is given below with reference to FIGS. 1 to 5B.

FIG. 1A is a view in longitudinal axial section of a pyrotechnic actuator according to a first embodiment of the invention, which has not yet operated.

FIG. 1B is the absorption device of FIG. 1A, but after having operated.

FIG. 2A is a view in longitudinal axial section of a pyrotechnic actuator according to a second embodiment of the invention, which has not yet operated.

FIG. 2B is the absorption device of FIG. 2A, but after having operated.

FIG. 3A is a view in longitudinal axial section of a pyrotechnic actuator according to a third embodiment of the invention, which has not yet operated.

FIG. 3B is the absorption device of FIG. 3A, but after having operated.

FIG. 4 is a view in longitudinal axial section of a pyrotechnic actuator according to a fourth embodiment of the invention, which has not yet operated.

FIGS. 5A and 5B represent two distinct embodiments of a non-return device fitted on the actuator to prevent movement of the piston in the reverse direction.

The pyrotechnic actuator (1, 1a, 1b, 1c) according to the invention is intended to apply a thrust action to an external part. The resistance exerted by this external part is embodied in FIGS. 1A to 4 by a spring R fixed on a plate and placed in opposition to the movement of the piston 9 of the actuator (1, 1a, 1b, 1c) according to the invention, described below.

Referring to FIGS. 1A to 4, a pyrotechnic actuator (1, 1a, 1b, 1c) according to the invention is constituted by a hollow body 2 delimiting three distinct portions following one upon the other: a combustion chamber 3 prolonged by a shut-off device 4, itself prolonged by a slide chamber 5. The combustion chamber 3, which is cylindrical, possesses at one of its ends an electropyrotechnic ignition system 6 and accommodates a pyrotechnic-gas generator 7. The other end of the said chamber 3 has an opening emerging, via a passage 8, on the slide chamber 5, which also has a cylindrical form and accommodates a piston 9 comprising a cylindrical body 10 prolonged by a central rod 11 of lesser diameter. The body 10 of the piston 9 has a diameter substantially less than that of the diameter of the inner wall of the slide chamber 5, so that the said piston 9 can slide in a sealed manner in the said chamber 5. Sealing joints can be provided on the piston 9 in order to obtain a perfect seal. The slide chamber 5 has at one of its ends an opening, from which emerges the free end of the central rod 11 of the piston 9, the said free end being covered over by a cap 12 having a plane circular face 13. The rotational axis of the combustion chamber 3 is merged with the rotational axis of the slide chamber 5. The passage 8 linking the combustion chamber 3 to the slide chamber 5 is partially delimited by a shut-off device (4, 4a, 4b, 4c) in the form of a hollow cylinder accommodating a slide valve part (15, 15a, 15b, 15c).

The shut-off device (4, 4a, 4b, 4c) has an elbow by which two rectilinear, mutually perpendicular portions can be defined. The first portion comprises at its free end a secondary electropyrotechnic ignition system 16, and the second portion, which comprises the said slide valve part (15, 15a, 15b, 15c), defines a slide housing (14, 14a, 14b, 14c) for the said slide valve part (15, 15a, 15b, 15c). The axis of the slide housing (14, 14a, 14b, 14c) is perpendicular to the axis of the combustion chamber 3 and to that of the slide chamber 5.

Preferably, the actuator (1, 1a, 1b, 1c, 1d) comprises a non-return device preventing the return movement of the piston 9 towards the inside of the slide chamber 5. According to the invention, once the piston 9 has reached a set position under the pressure of the gases present in the slide chamber 5, it is no longer able, by virtue of the non-return device, to slide in the reverse direction, that is to say towards the inside of the slide chamber 5. With reference to FIG. 5B, this non-return device will be able to be constituted, for example, by balls 100 accommodated in a portion of the piston 9. When the piston 9 returns towards the inside of the slide chamber, the balls 100 follow a tapered profile 101 formed on the side wall of the piston 9 and thus proceed to rub against the inner wall 50 of the cylinder delimiting the slide chamber 5 of the piston 9. By means of the balls 100, the return movement of the piston 9 towards the inside of the slide chamber 5 can thus be prevented and the piston 9 halted in the position determined by the pressure of the gases present in the slide chamber 5. According to one design variant represented in FIG. 5A, the non-return device is constituted by a serrated washer 110 slipped around the rod 11 of the piston 9 and accommodated in an annular groove 51 formed on the inner wall 50 of the cylinder delimiting the slide chamber 5 of the piston 9. The washer 110 has a shape which is convergent in the direction of thrust of the piston 9. The diameter of the central aperture in the washer is determined such that the washer 110 is in contact with the rod 11 of the piston 9. When the piston moves in the direction of the arrow in FIG. 5A in order to exert a thrust, the rod 11 slides relative to the washer 110 and thus withdraws from the actuator. During movement in the reverse direction, the washer 110 held in the groove 51 is pulled inward and, by virtue of its convergence, prevents the piston 9 from returning towards the inside of the slide chamber 5.

The first operating stages of a pyrotechnic actuator (1, 1a, 1b, 1c) according to the invention, presented below, are identical for all the embodiments described below with reference to FIGS. 1A to 4.

An electrical trigger pulse reaches the electropyrotechnic ignition system 6, which is then activated and starts up the pyrotechnic-gas generator 7.

The gases emitted by the generator 7 reach the slide chamber 5 via the passage 8, the said chamber 5 then being pressurized. Over and above a threshold pressure in the said chamber 5, a function of the stiffness of the spring R, the piston 9 commences a displacement. In the course of this displacement phase and on the order of a control room which, at the end of a predetermined period, sends an electrical pulse to the ignition system 16 of the shut-off device (4, 4a, 4b, 4c), the said device (4, 4a, 4b, 4c) starts up, causing the displacement of the slide valve part (15, 15a, 15b, 15c) in the slide housing (14, 14a, 14b, 14c) under the effect of the gases emitted by the said ignition system 16.

In the remainder of the description, only certain parts which have been structurally modified between the different embodiments assume a new reference for each embodiment described.

According to a first embodiment of the invention represented in FIGS. 1A and 1B, the said housing 14 is separated from the passage 8 by a material veil 17 and possesses a vent 18 emerging on the outside of the said actuator 1. The said housing 14 therefore defines an open space separated both from the combustion chamber 3 and from the slide chamber 5 of the piston 9. According to this first embodiment, the slide valve part 15 is constituted by a hollow cylindrical part having an opening on its side wall and comprising an open, cutting and bevelled end 19. The slide valve part 15 is placed in the slide housing 14 such that its cutting end lies opposite the material veil 17.

According to the first embodiment, the cutting end 19 of the said part 15 causes the material veil 17 to rupture, establishing a communication between the combustion chamber 3 and the slide housing 14 via the slide valve part 15, which thus creates a new passage. Simultaneously to this link-up the part 15, by virtue of a portion of its side wall, shuts off the slide chamber 5. The gases emitted by the pyrotechnic generator 7 situated in the combustion chamber 3 no longer penetrate into the slide chamber 5 and are in this case diverted towards the slide housing 14, which evacuates them towards the exterior via its vent 18. Since the slide chamber 5 is no longer supplied with gas, the piston 9, subjected on either side to two contrary forces, discontinues its stroke and remains frozen in this position. The holding of the piston 9 in the frozen position is also secured by a non-return device, such as described above with reference to FIG. 5A or 5B.

According to a second embodiment of the invention represented in FIGS. 2A and 2B, the slide valve part 15a is traversed transversely by a duct 150a. With reference to FIG. 2A, the slide valve part 15a is initially positioned so that the duct 150a is placed opposite the passage 8 linking the slide chamber 5 to the combustion chamber 3 in such a way as to free the said passage 8 for the admission of the gases emanating from the combustion chamber 3. According to this second embodiment, the combustion chamber 3 is breached by an aperture 30a emerging in the slide housing 14a. The slide valve part 15a is initially positioned in such a way as to shut off the said aperture 30a. According to the invention, as represented in FIG. 2A, initially, the gases issuing from the combustion chamber 3 can therefore only pass through the passage 8 opened by the duct 150 formed through the slide valve part 15a. Another aperture 18a is formed on the slide housing 14 substantially opposite the aperture 30a formed on the combustion chamber 3.

According to this second embodiment, the movement of the slide valve part 15a under the effect of the gases emitted by the ignition system 16 causes the shutting-off of the passage 8 between the combustion chamber 3 and the slide chamber 5. The slide valve part 15a moves under the action of the gases up to a stop position in which it shuts off the passage 8 linking the combustion chamber 3 to the slide chamber and in which its duct 150a lies opposite the aperture 30a formed on the combustion chamber 3 and the aperture 18a formed on the slide housing 14 and emerging on the outside of the actuator. In this way, those gases which are produced in the combustion chamber 3 and can no longer rejoin the slide chamber 5 owing to the closure of the passage 8 by the slide valve part 15a are evacuated towards the outside of the actuator 1 through the aperture 18a. The aperture 30a formed on the combustion chamber 3, the duct 150a and the aperture 18a emerging on the outside of the actuator thus form a vent for the combustion chamber 3. As in the first embodiment, the shutting-off of the slide chamber 5 freezes the position of the piston in this chamber 5. The non-return device allows the piston 9 to remain in this position even if a fall in pressure occurs in the slide chamber 5.

According to a third embodiment represented in FIGS. 3A and 3B, the slide housing 14b of the shut-off device 4b in communication with the combustion chamber 3 comprises an embrittlement zone 18b, constituted, for example, by a breakable cap, situated at the stroke completion end of the slide valve part 15b in its slide housing 14b. The slide valve part 15b of the shut-off device 4b is of the same type as that integral with the actuator 1 according to the first embodiment. This slide valve part 15b is therefore constituted by a hollow cylindrical part 150b having an opening on its side wall and comprising an open, cutting and bevelled end 19b. The slide valve part 15b is placed in the slide housing 14b such that its cutting end lies opposite the embrittlement zone 18b. The slide valve part 15b, under the effect of the gases produced by the ignition system 16, moves and proceeds to shut off, by virtue of a portion of its side wall, the passage 8 linking the combustion chamber 3 to the slide chamber 5. The displacement of the slide valve part 15b occurs to the point where the cutting end 19b of the said slide valve part 15b proceeds to pierce the embrittlement zone 18b situated, for example, at the end of the slide stroke of the slide valve part 15b. A communication is in this case established between the combustion chamber 3 and the outside of the actuator 1b by the slide valve part 15b, the hollow portion 150b of which forms a conduit diverting the gases towards the hole formed after the rupturing of the embrittlement zone 18b. Since the slide chamber 5 is no longer supplied with gas, the force generated by the pressure of the gases in the slide chamber 5 and the resistance force generated by the spring R counterbalance each other, with the result that the piston 9 discontinues its stroke and remains frozen in this position. By means of a non-return device, the holding of the piston 9 in this position is able to be secured.

According to a fourth embodiment represented in FIG. 4, the slide valve part 15c is similar to that described above with reference to the second embodiment. The slide valve part 15c is therefore a solid part traversed by a duct 150c. Initially, the slide valve part 15c is positioned so that its duct 150c is placed opposite the passage 8 formed between the combustion chamber 3 and the slide chamber 5. Thus, the gases emitted by the pyrotechnic generator 7 are able to rejoin the slide chamber 5 and allow the advancement of the piston 9 in the slide chamber 5.

According to this fourth embodiment, the body 2c (FIG. 4) of the actuator 1c comprises at the level of the combustion chamber 3 a calibrated cap 18c capable of rupturing over and above a threshold pressure prevailing in the combustion chamber 3. According to this fourth embodiment, the slide valve part 15c, under the action of the gases emitted by the ignition system 16 of the shut-off device 4c, moves and proceeds to shut off the passage 8 between the combustion chamber 3 and the slide chamber, preventing any entry of the gases into the slide chamber 5. The force generated by the pressure of the gases in the slide chamber 5 and the resistance force generated by the spring R counterbalance each other and the piston 9 freezes in this position. A non-return device such as described above with reference to FIGS. 5A and 5B can be adjusted on the actuator 1c in order to prevent a return movement of the piston 9. The generator 7 continues to produce gases which are held in the combustion chamber 3. The pressure therefore increases in the combustion chamber 3 and over and above a threshold pressure in the combustion chamber 3, the calibrated cap 18c ruptures, thus creating a link between the combustion chamber 3 and the outside of the actuator 1c. The gases present in the combustion chamber are thus evacuated towards the exterior through the hole formed on the body of the actuator following the rupturing of the calibrated cap 18c.

The pyrotechnic actuator such as described above with reference to FIGS. 1A to 4 is variable-thrust-acting. The quantity of gas sent into the slide chamber freezes the piston in a set position. Nevertheless, the displacement amplitude of the piston is a function entirely of the resistance of the part to which the thrust is applied. According to the invention, it is possible to obtain an actuator of the parameterizable stroke type by directly integrating means for resisting the displacement of the piston of the actuator. This will be a matter, for example, of placing a spring around the rod of the piston. Since the stiffness constant of this spring is known, the displacement amplitude of the piston will no longer be solely dependent on the resistance of the part to which the thrust is applied.

The invention claimed is:

1. A pyrotechnic actuator, comprising:
   a pyrotechnic-gas generator,
   a combustion chamber,
   a piston which can move in a slide chamber under the effect of gases, and
   a shut-off device used after triggering of the actuator to close the slide chamber and secure the depressurization of the combustion chamber.

2. The actuator according to claim 1, wherein the shut-off device is autonomous and can be triggered from a control room.

3. The actuator according to claim 1, wherein the shut-off device is incorporated in the combustion chamber and is in contact with the slide chamber.

4. The actuator according to claim 1, wherein the shut-off device comprises a slide valve part that moves under the effect of a motor in a slide housing.

5. The actuator according to claim 4, wherein the motor is a pyrotechnic-gas generator.

6. The actuator according to claim 4, wherein a displacement of the slide valve part in the slide housing takes place along an axis perpendicular to that of a displacement of the piston.

7. The actuator according to claim 4, wherein the slide housing is equipped with a vent, the slide housing and the combustion chamber being separated from each other by a material veil.

8. The actuator according to claim 7, wherein the slide valve part is hollow and has a cutting, end, so that the displacement of the slide valve part in the slide housing firstly brings about a rupturing of the material veil, then, simultaneously, the shutting-off of the slide chamber of the piston and a link-up of the combustion chamber with the slide housing.

9. The actuator according to claim 4, wherein the combustion chamber comprises at least one vent emerging on the outside of the actuator, so that the shut-off device, which initially shuts off the vent and allows communication between the slide chamber and the combustion chamber, moves so as to proceed to shut off the slide chamber and free the vent in order to evacuate the gases from the combustion chamber.

10. The actuator according to claim 9, wherein the slide valve part is traversed by a duct initially linking the combustion chamber to the slide chamber, the slide valve part being capable of moving in the slide space under the effect of the motor such that the duct links the combustion chamber to the outside of the actuator at the level of the vent.

11. The actuator according to claim 4, wherein the combustion chamber possesses an embrittlement zone, so that the shut-off device, which initially allows communication between the slide chamber and the combustion chamber, moves so as to proceed to shut off the slide chamber and cause the combustion chamber to open at the level of its embrittlement zone.

12. The actuator according to claim 11, wherein the slide valve part is hollow and has a cutting end, so that the displacement of the slide valve part in the slide housing brings about the shutting-off of the slide chamber and causes the embrittlement zone to rupture, by mechanical impact, in order to evacuate the gases emanating from the generator towards the outside of the actuator.

13. The actuator according to claim 4, wherein the combustion chamber comprises a calibrated cap capable of rupturing over and above a threshold pressure in order to evacuate the gases towards the outside of the actuator.

14. The actuator according to claim 1, wherein the piston has a body prolonged by a rod, the diameter of the body being substantially less than that of the slide chamber.

15. The actuator according to claim 1, further comprising a non-return device preventing a return movement of the piston towards the inside of the slide chamber.

16. The actuator according to claim 14, further comprising means for resisting movement of the piston generated under an effect of the gases.

17. The actuator according to claim 16, the means for resisting movement comprise a spring placed around the rod of the piston.

* * * * *